Patented Oct. 17, 1939

2,176,162

UNITED STATES PATENT OFFICE 2,176,162

DEPILATING ADHESIVE

Charles T. Walter, Chicago, Ill., assignor to Industrial Patents Corporation, Chicago, Ill., a corporation of Delaware No Drawing. Application August 27, 1937, Serial No. 161,279

5 Claims. (Cl. 17—1)

This invention relates to food carcass depilatories for the removal of dermal excrescences from edible carcasses.

One of the objects of the invention is to provide an improved and less expensive material or compound than those heretofore known or used for the purposes specified.

Another object of the invention is to utilize such common and inexpensive materials as rosin and asphalt to provide a depilatory adapted for liquefaction in mass by moderate heat and for subsequent setting when applied as a coating and chilled.

Another object of the invention is to provide a chill hardening adhesive adapted for spraying when hot and adapted for stripping off together with all dermal excrescences and other extraneous matter when set as a hard coating and to provide an effective carcass stripper thus composed adapted for ready renovation, by heat liquefaction and filtration, for re-use.

The depilatory of the present invention has been found particularly effective in removing hog hair in accordance with the teachings of my prior Patent No. 1,721,610.

The objects of the present invention are accomplished by fusing together resinous material and soft asphalt in appropriate proportions and applying the compound while liquid as a thin coating to the skin of the carcass to be treated.

The compound is permitted to congeal and then removed, carrying with it all dermal excrescences. The compound may then be recovered by fusing and straining out the foreign matter.

The compound may be prepared by mixing rosin and a soft asphalt such as is produced by passing air or steam through the residue from oil distillation until the product reaches the specification desired. I have found a satisfactory soft asphalt to be a product known on the market as R. S. A. Parolite asphalt, prepared from the residue from the distillation of Mid-Continent crude oil having the following specifications:

Melting point_____170–185° F.
Penetration at 32° F._____Not less than 40.
Penetration at 77° F._____70–85.

It will be understood that any soft asphalt of this character may be satisfactorily employed in carrying out the invention.

With a soft asphalt of these specifications, an effective mixture for removing hog hair comprises sixty per cent rosin and forty per cent soft asphalt. The preferred quantity of rosin for use in depilating hogs ranges between forty per cent and seventy per cent.

In practice the mixture is made by melting the two constituents, heating them to the proper temperature, and applying a coat of the molten mixture to the surface of an edible carcass, after which the coating is congealed. This may be readily done by spraying with cold water. It will be understood that any desired methods of application, congelation, and removal may be employed.

As will be apparent from the foregoing statement of the objects of the invention and description of the soft asphalt employed in the compound, the mixture of the present invention is effective with relatively smaller percentages of rosin than could be employed in mixtures in which cottonseed oil or its equivalent is used. Furthermore, it will be noted that the constants of the soft asphalt employed in the compound of the present invention are such that extremely high temperatures are not needed to fuse the soft asphalt and the rosin with the result that the mixture may be employed at temperatures which will not damage the surface of the carcass upon which it is employed. The mixture is extremely effective and upon congelation holds the hairs firmly, giving better results than is the case in heretofore known dehairing compounds.

Although but one specific embodiment of this invention is herein described, it is to be understood that no attempt has been made to describe specifically all useful embodiments and that some of the details set forth may be altered or omitted without departing from the spirit of the invention as described in the claims which follow.

I claim:

1. A depilatory including an asphalt having a melting point of substantially 170° to 185° Fahrenheit, a penetration at 32° Fahrenheit of not less than 40, and a penetration at 77° Fahrenheit of 70 to 85.

2. A depilatory comprising about forty per cent rosin and a complement of an asphalt having a melting point of substantially 170° to 185° Fahrenheit, a penetration at 32° Fahrenheit of not less than 40, and a penetration at 77° Fahrenheit of 70 to 85.

3. A depilatory comprising about forty per cent rosin and a complement of the soft asphalt of the residue of crude oil distillation.

4. A depilatory consisting of substantially forty to seventy per cent of resinous material and a complement of the soft asphalt of the residue of crude oil distillation.

5. A depilatory including crude oil distillation residue soft asphalt.

CHARLES T. WALTER.

CERTIFICATE OF CORRECTION.

Patent No. 2,176,162. October 17, 1939

CHARLES T. WALTER.

It is hereby certified that error appears in the printed specification of the above numbered patent requiring correction as follows: First column, line 38, before the word "oil" insert crude; and that the said Letters Patent should be read with this correction therein that the same may conform to the record of the case in the Patent Office.

Signed and sealed this 21st day of November, A. D. 1939.

(Seal)

Henry Van Arsdale,
Acting Commissioner of Patents.